US006956752B2

(12) United States Patent
Miermans

(10) Patent No.: US 6,956,752 B2
(45) Date of Patent: Oct. 18, 2005

(54) POWER SUPPLY ARCHITECTURE WITH CONTROLLED POWER-ON AND POWER-OFF SEQUENCE

(75) Inventor: Hubertus Cornelis Miermans, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 27 days.

(21) Appl. No.: 10/479,362

(22) PCT Filed: Jun. 3, 2002

(86) PCT No.: PCT/IB02/02027

§ 371 (c)(1),
(2), (4) Date: Dec. 2, 2003

(87) PCT Pub. No.: WO02/099948

PCT Pub. Date: Dec. 12, 2002

(65) Prior Publication Data

US 2004/0160793 A1 Aug. 19, 2004

(30) Foreign Application Priority Data

Jun. 5, 2001 (EP) .................................. 01202126

(51) Int. Cl.[7] ............................................. H02M 7/00
(52) U.S. Cl. .............................. 363/65; 363/70; 363/71
(58) Field of Search ............................... 363/65, 71, 72

(56) References Cited

U.S. PATENT DOCUMENTS

| 5,659,208 A | * | 8/1997 | Kimble et al. ................. 307/82 |
| 5,751,150 A | * | 5/1998 | Rippel et al. ................ 324/537 |
| 6,160,722 A | * | 12/2000 | Thommes et al. ............. 363/37 |
| 6,466,469 B1 | * | 10/2002 | Caruthers et al. ............. 363/72 |

* cited by examiner

Primary Examiner—Bao Q. Vu
(74) Attorney, Agent, or Firm—Edward W. Goodman

(57) ABSTRACT

A power supply apparatus converts an input voltage (2) into a first (3) and a second output voltage (7). The first (3) and the second output voltage (7) are put into and/or out of operation sequentially. The power supply apparatus comprises a first converter unit (1) which converts the input voltage (2) into the first output voltage (3), and a second converter unit ( 5) for providing the second output voltage (7). The second converter unit input (6) is coupled to the first converter unit output (3). The second converter unit (5) can only start and provide an output voltage after the first converter unit (1) has started. During power-down, a sequence is created in which the second converter unit remains operational until any capacitance coupled to the first converter unit output has been discharged.

7 Claims, 2 Drawing Sheets

POWER SUPPLY ARCHITECTURE WITH CONTROLLED POWER-ON AND POWER-OFF SEQUENCE

Figure 1:
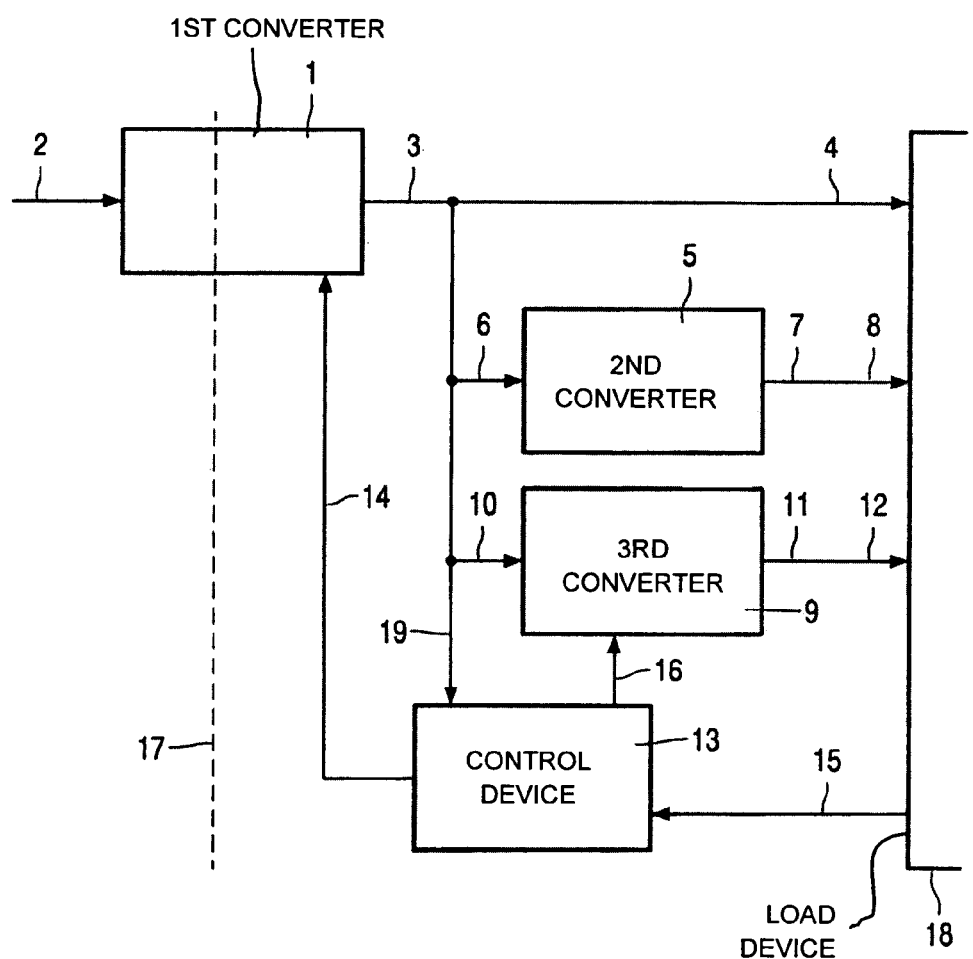

The invention relates to a power supply apparatus, in particular a switched-mode power supply apparatus, for converting an input voltage into a first output voltage and into a second output voltage, and for providing a predetermined power-on and/or power-off sequence, wherein the first output voltage and the second output voltage are put into and/or out of operation in a specific sequence, the power supply apparatus comprising a first converter unit having an input for receiving the input voltage and an output for supplying the first output voltage. The invention also relates to a method of putting such a power supply apparatus into operation. The invention also relates to a method of putting such a power supply apparatus out of operation.

Power supplies, such as switched-mode power supplies are used in a wide range of electronic equipment such as computing and telecommunication equipment, video equipment and displays. In most cases, the power supply apparatus generates multiple output voltages for providing separate electric supply voltages to multiple electronic circuits or devices and/or for providing multiple supply voltages to a single electronic circuit or device. For reliability or other reasons, a predetermined sequence for applying and/or removing these voltages during power-up and/or during power-down is required. Such a sequence may occur, for example, in electronic devices having a display, such as a liquid crystal display or a plasma display panel. Also in power supply apparatus for other electronic equipment, a controlled power-up/power-down sequence is required.

WO 98/38727 discloses a switched-mode power supply having a switch for coupling one of the output voltages of the switched-mode power supply to a load. The switched-mode power supply also has a logic circuit for controlling the switching means. During normal operation, the switching means is closed so as to apply the output voltage supplied at the respective output terminal to the load. During power-up and power-down, the switching means can be opened for instantaneously disconnecting the respective output voltage from the load. As the other output voltage or other output voltages remain coupled to the load, the respective output voltage which is disconnected via the switching means during power-down is removed instantaneously, while the other output voltages show a slow decay because of the charge stored in capacitors of the switched-mode power supply secondary circuit.

A disadvantage is that the start-up and/or power-down sequence of the power supply is largely dependent on the characteristics of the load. In the case where the load shows a significant capacitance, the decay of the respective supply voltages supplied by the power supply may largely differ depending on the value of the capacitance, as well as the amount of current drawn from this capacitance by the load. Another disadvantage is that the power switch which is required to couple the output voltage which is to be switched to the load, increases the manufacturing as well as component costs of the power supply. To achieve optimum power efficiency, and to maintain optimum regulation of the output voltage, the on-resistance of the switch needs to be low to avoid a voltage drop. Also, complex detection circuitry, such as under voltage detection is required for controlling the switch, further complicating the switched-mode power supply. Still another disadvantage is that, although one of the output voltages is disconnected from the load by the switch, a certain voltage may remain present after opening the switch in one or more capacitances which form part of the load. This remaining voltage may lead to safety or reliability problems because, although the switch is open and consequently the respective output voltage of the power supply is disconnected, a voltage remains present in the circuit due to the charge stored in the capacitance or capacitances.

To try to at least partly overcome the above disadvantages, a switched-mode power supply architecture is known, having multiple converter units in parallel. Each converter unit is coupled with its input to the input voltage terminal, whereas each converter unit supplies at least one output voltage at an output voltage terminal to a load device. For controlling the start-up and/or power-down sequence of this switched-mode power supply, sequence logic is provided for activating and/or deactivating each converter unit in a predetermined sequence. Furthermore, a discharge circuit may be provided for discharging at least one output voltage terminal after deactivating the associated converter unit. The discharge circuit can be controlled by the sequence logic. A disadvantage is that the cost of this power supply architecture is high, as each supply voltage, or group of supply voltages which is to be activated and/or deactivated at a certain moment in a power-up and/or power-down sequence, requires a separate converter unit. Due to the high number of converter units, the dimensions of such a switched-mode power supply are large, which means, for example, that such a switched-mode power supply requires a large printed circuit board area. A further disadvantage is that the electromagnetic compatibility performance of such a power supply is poor. As each converter unit is coupled to the input voltage, the sensitivity to disturbances, such as spikes on the input voltage is high, requiring additional measures to be able to fulfil electromagnetic compatibility requirements and regulations. Moreover, if an isolation between the input voltage and the output voltages of the switched-mode power supply apparatus is required, each converter unit requires a galvanic isolation, and the sequence logic also requires a galvanic isolation. Due to the isolation in all converter units as well as in the sequence logic, the cost of the power supply will increase further. A further disadvantage is that, due to the multiple galvanic isolation, the leakage current will be high. Still a further disadvantage is that the discharge circuit might have large dimensions, since relatively large components which are able to dissipate a significant amount of electrical energy within a short period of time, might be required.

In this document, all voltages should be interpreted in an absolute sense, i.e. voltages may be positive as well as negative, and an increase, and a decrease, respectively, of a voltage should also be interpreted in an absolute sense.

Within the scope of this document, the expressions power-on and power-up, and the expressions power-off and power-down have the same meaning and, consequently, these expressions can be mutually interchanged.

It is an object of the invention to eliminate or at least mitigate the problems associated with the prior art. It is another object of the invention to simplify the architecture of a power supply having a controlled power-on and/or power-off sequence. It is a further object of the invention to apply and/or disapply the multiple voltages supplied by the power supply in a controlled manner.

To achieve these and other goals, the power supply apparatus according to the invention is characterized in that it further comprises a second converter unit having an input which is coupled to the first converter unit output and an output for supplying the second output voltage. Since the input of the second converter unit is coupled to the output of the first converter unit, the second converter unit will only start operating at the moment when the output voltage of the first converter unit reaches a certain value. As the second converter unit is supplied with electrical energy by the first converter unit, it is impossible for the second converter unit to start before the first converter unit has started. Also, the power-down sequence has a clearly defined behavior. When, for example, the input voltage is removed, first, the first converter unit will continue its operation by discharging any capacitance coupled to its input, and then stop operating. At this moment, the output voltage of the first converter unit will remain present for some time because of the electrical energy stored in the capacitance or capacitances coupled to the output of the first converter unit. Because of the presence of a voltage at the output of the first converter unit, the second converter unit will remain operational. In this process, the second converter unit will draw current from the capacitance or capacitances coupled to the output of the first converter unit. This causes the capacitances to discharge to a lower voltage level. At a certain instant, the voltage level will be lowered to such an extent that the second converter unit will stop operation. From this moment, the second output voltage will also show a decay. Consequently, during power-up, the power supply according to the invention will first show a rise of the first output voltage, and only after reaching a certain, predetermined value, the second output voltage will start to increase. Also during power-down a sequence is ensured, as the second converter unit will continue to operate until the first output voltage has been discharged to a predetermined level. A further advantage of the power supply architecture according to the invention is that, in case a galvanic isolation is required, only the first converter unit will require such an isolation. As the second converter unit is coupled to an output of the first converter unit, it will thereby be isolated too. Moreover, the power supply architecture will easily fulfil electromagnetic compatibility and leakage current requirements, as only the first converter unit is coupled to the input voltage, resulting in a good isolation between the input voltage terminal and the output voltage terminals.

Advantageously, the power supply apparatus comprises control means providing a first control signal to the first converter unit, for enabling the first converter unit to operate at a lower output voltage than the first output voltage. By enabling the first converter unit to operate at a lower output voltage, the power-up and power-down behavior can be further improved. By operating the first converter unit at a lower, predetermined output voltage, the first output voltage stays at a low, safe level during a certain period of time. This voltage level should be sufficient to start up the second converter unit. This allows, for example, creation of a sequence of successively activated output voltages, wherein the first converter unit is started to operate at a predetermined, lower output voltage, then the second converter unit starts operation and thus starts to provide the second output voltage, where after the first converter unit is brought to normal operating conditions, resulting in a fully operational first output voltage. During power-down, the same sequence in reverse order can be applied.

Advantageously, the power supply apparatus is supplied with a second control signal input coupled to the control means for controlling the control means, wherein advantageously the second control signal is generated by a load device coupled to the power supply apparatus or coupled to at least one of the converter unit outputs. By controlling the control means via a control signal, coupled to a control signal input, the start-up behavior can be easily controlled.

When the second control signal is generated by a load device, the load device can provide feedback to the power supply apparatus so that the sequence and/or timing of the power-on and/or power-off process can be controlled by the load device. This makes it possible for the load device to indicate when it is ready to receive a certain supply voltage, or when it is ready for a certain supply voltage to increase from a predetermined lower value to a normal operational value. By coupling the second control signal to at least one of the converter unit outputs, the value of the voltage at an output of a converter unit can be used to control the power-on and/or the power-off sequence.

Advantageously, the power supply comprises at least a third converter unit having an input which is coupled to the first converter unit output and an output for supplying a third output voltage. If at least a third output voltage is required, the power supply apparatus may comprise at least one additional, third, converter unit with an input being coupled to the first converter unit output. Thus, multiple output voltages can be created, having a predetermined power-on and/or power-off sequence. As only the first converter unit is coupled to the input voltage and as the third, or further converter unit inputs are coupled to the first converter unit output, the additional converter unit or converter units are coupled to the first converter unit in a similar manner as the second converter unit, so that all advantages of the invention remain applicable.

Advantageously, a third control signal is supplied by the control means for controlling at least one of the second and/or third converter units. By controlling at least one of the second and third converter units via a third control signal, a power-on and/or power-off sequence can be created for the second and third converter units.

The invention also relates to a method of putting such a power supply apparatus into operation, and is characterized by the steps of putting the first converter unit into operation, and after reaching a predetermined output voltage at the first converter unit output, putting the second converter unit into operation.

Advantageously, the method comprises the further step of increasing the value of the voltage at the first converter unit output to an operational value. Advantageously, the increase of the voltage at the first converter unit output to an operational value is performed in response to a control signal generated by a load device coupled to the power supply apparatus.

The invention also relates to a method of putting such a power supply apparatus out of operation, and is characterized by the steps of putting the first converter unit out of operation, discharging the first converter unit output to or below a predetermined voltage by supplying electric current from the first converter unit output to the second converter unit input, and putting the second converter unit out of operation when the first converter unit output is at least partly discharged.

Advantageously, the method further comprises the step of further discharging the first converter unit output via the second converter unit input voltage, and/or via a load device, coupled to the first converter unit output.

Thus, the power supply apparatus according to the invention allows a controlled and reliable power-on and/or power-off sequence, with simple means by coupling the second converter unit input to the first converter unit output.

Figure 2:
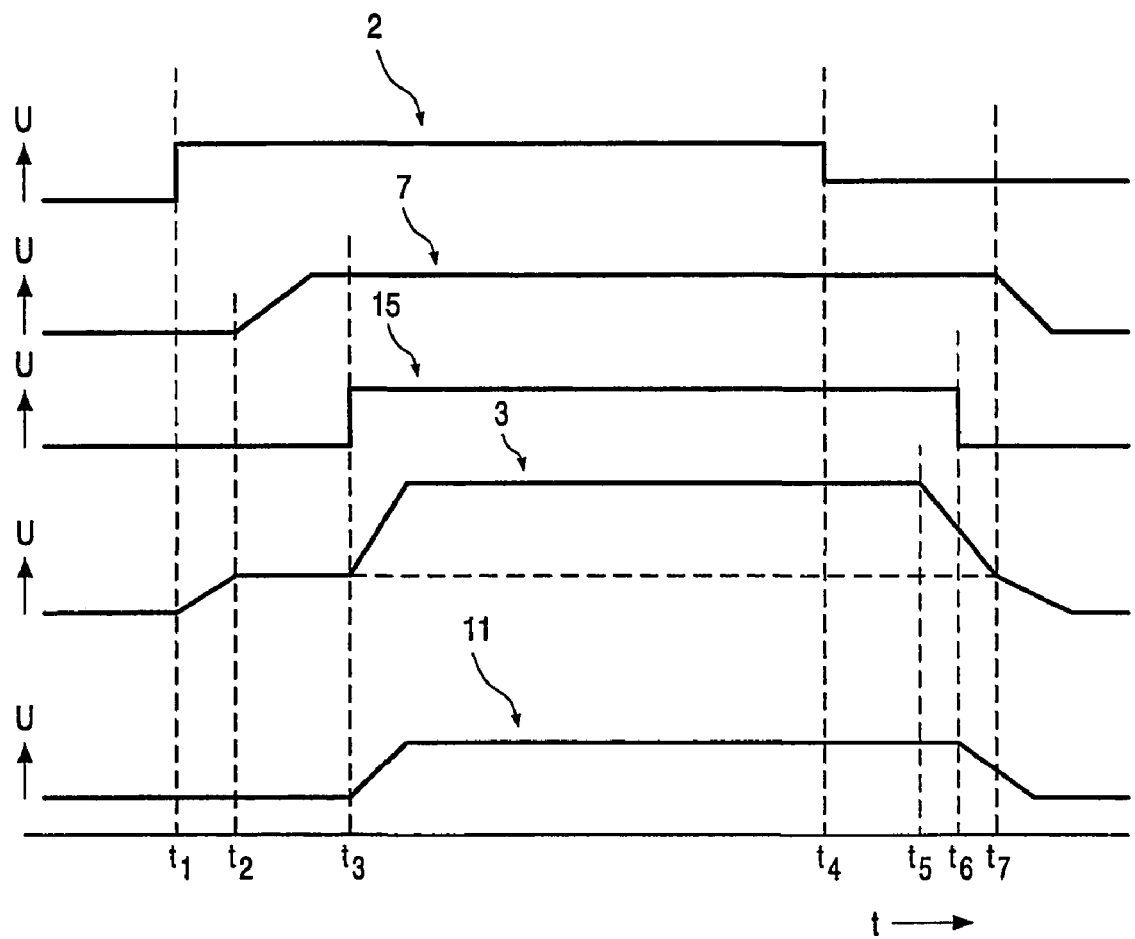

Further features and advantages will become clear from the appended drawings, illustrating a non-limiting embodiment of the invention, in which:

FIG. 1 shows an electrical circuit block diagram of an embodiment of a switched-mode power supply apparatus according to the invention; and FIG. 2 shows a simplified timing diagram of a power-up and power-down sequence of the switched-mode power supply according to FIG. 1.

In these Figures, identical reference numerals refer to similar or identical items.

A switched-mode power supply apparatus in FIG. 1 comprises a first converter unit 1 for converting an input voltage applied at an input terminal 2 into an output voltage supplied at an output terminal 3. The output terminal 3 of the first converter unit 1 is coupled to a load device 18 and supplies a first supply voltage to a first input terminal 4 of the load device 18. The power supply apparatus also comprises a second converter unit 5 with an input terminal 6, coupled to the output terminal 3 of the first converter unit 1. An output terminal 7 of the second converter unit 5 is coupled to a second input terminal 8 of the load device 18 and provides a second supply voltage to the load device 18. The power supply apparatus also comprises a third converter unit 9, having an input terminal 10, coupled to the output terminal 3 of the first converter unit 1 and an output terminal 11 coupled to a third input terminal 12 of the load device 18 for providing a third supply voltage to the load device 18. However, the power supply apparatus comprises a control means, being a control device 13. The control device 13 controls the first converter unit 1 via a first control signal 14. The control device 13 is controlled by a second control signal 15 which is generated by the load device 18, and by a third control signal 19 which is based on the output voltage of the first converter unit 1. The control device 13 controls the third converter unit 9 via a fourth control signal 16.

The load device 18 is galvanically isolated from the input voltage 2 by means of an isolation in the first converter unit 1, which isolation is indicated by the dashed line 17. As the galvanic isolation is placed in the first converter unit 1, no further galvanic isolation is required in the second converter unit 5 and the third converter unit 9.

FIG. 2 illustrates voltages U versus time t characteristics of various terminals of the apparatus. At a time indicated by t1, the input voltage at an input voltage terminal 2 is applied. As a result, the output voltage at the output voltage terminal 3 of the first converter unit 1 starts to rise. At a time indicated by t2, the output voltage at the output voltage terminal 3 has reached a value which is sufficient to start the second converter unit 5 resulting in a rise of its output voltage at the output voltage terminal 7. The output voltage of the first converter unit 1 will reach a predetermined value and stays at this value. At a time indicated by t3, the load device 18 will indicate, by a change in the value of the second control signal 15, that it is ready to receive at the first input terminal 4 the full operational value of the first output voltage at the output terminal 3 and to receive the output voltage of the third converter unit 9 from the output terminal 11 at the third input terminal 12. Consequently, in response to the change in the control signal 15, the control device 13 enables the first converter unit 1 via the first control signal 14 to operate at the normal, operational value of the output voltage at the output terminal 3, so that this voltage will rise to its operational value, and the control device 13 simultaneously enables the third converter unit 9 to start operation, so that the output voltage at the output terminal 11 of the third converter unit 9 will rise.

As a result, a power-up sequence is achieved wherein first the first converter unit 1 is started and reaches a safe low output voltage, the second converter unit 5 is started, and thereafter the third converter unit 9 is started, while at the same time the first converter unit 1 is enabled to operate at its normal operational value.

When the power supply is switched off, for example by discontinuing the input voltage supplied at the input voltage terminal 2 at a time t4, first the output voltage at the output terminal 3 of the first converter unit 1 starts to decrease. This starts starting at a time t5, after the capacitance at the input voltage terminal 2 has been partly discharged. The other output voltages at the output terminals 7, 11 remain present, as the voltage at the output terminal 3 of the first converter unit 1 is still sufficient to power the second converter unit 5 and the third converter unit 9. At a time t6, the load device 18 indicates via the second control signal 15 to the control unit 13 that the output voltage at the output terminal 3 has been lowered to such an extent that the other output voltages of the converter can be, or need to be switched off. Consequently, the control unit 13 disables the third converter unit 9 via the third control signal 16, causing the output voltage at the output terminal 11 of the third converter unit 9 to decrease. The second converter unit 5 is still operational, and thus, because of the electrical energy required for its operation, it is further discharging the capacitance coupled to the output voltage terminal 3 of the first converter unit 1. Possibly, the charge stored in a capacitance coupled to the input voltage terminal 2 may enable the first converter unit 1 to operate at the low, predetermined output voltage for a limited period, until this capacitance has been discharged to such an extent that the first converter unit 1 will stop operation. At a time t7, the output voltage at the output terminal 3 has decreased to such an extent that the voltage is insufficient to continue the operation of the second converter unit 5, causing the second converter unit 5 to discontinue operation, resulting in a decay of the output voltage at the output terminal 7 of the second converter unit 5.

As a result, a power-down sequence has been created, whereby first the output voltage of the first converter unit 1 at its output terminal 3 decreases, the capacitance coupled to the output terminal 3 is discharged via the second converter unit 5 as well as partly by the third converter unit 9, resulting in a fast decay of the output voltage at the output terminal 3, whereafter first the output voltage at the output terminal 11 and then the output voltage at the output terminal 7 start to decrease.

Thus, the power supply according to the invention provides a well-defined power-on and/or power-off sequence, and it discharges any capacitance coupled to the first output terminal 3 during power-down without the need to provide a separate discharging device.

Although in this document only an application of the invention using a switched-mode power supply is described, the invention may of course also be applied with other types of power supplies, such as a resonant mode power supply. Moreover, each first, second and third converter unit may of course provide multiple output voltages for providing multiple supply voltages to a load. Furthermore, the load or load-device may not only comprise a single electric or electronic circuit or device but also multiple electric or electronic circuits or devices.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A power supply apparatus, for converting an input voltage into a first output voltage and a second output voltage and for providing a predetermined power-on and/or power-off sequence, wherein the first output voltage and the second output voltage are put into and/or out of operation in a specific sequence, the power supply apparatus comprising a first converter unit having an input for receiving the input voltage, storage means coupled to said input for storing the input voltage, and an output for supplying the first output voltage, characterized in that the power supply apparatus further comprises a second converter unit having an input coupled to the output of the first converter unit, second storage means coupled to the input for storing a voltage applied to the input, and an output for supplying the second output voltage, wherein upon application of said input voltage to said power supply apparatus, voltage from said first converter unit increases to said first output voltage, and when the voltage from said first converter unit reaches a certain voltage, the voltage from said second converter unit increases to said second output voltage, and wherein upon removal of said input voltage from said power supply apparatus, said first converter unit begins to discharge said first storage means and eventually said output voltage drops below said first output voltage, and the second converter unit then begins to discharge said second storage unit until subsequently said output voltage drops below said second output voltage.

2. The power supply apparatus as claimed in claim 1, characterized in that said power supply apparatus further comprises control means for providing a first control signal to the first converter unit, said first control signal enabling the first converter unit to operate at a lower output voltage than the first output voltage.

3. The power supply apparatus as claimed in claim 2, characterized in that said control means receives a second control signal from a load device coupled to the power supply apparatus.

4. The power supply apparatus as claimed in claim 3, characterized in that the second control signal determines when the first output voltage should be put into and/or out of operation.

5. The power supply apparatus as claimed in claim 1, characterized in that said power supply apparatus further comprises at least a third converter unit having an input coupled to the output of the first converter unit and an output for supplying at least a third output voltage.

6. The power supply apparatus as claimed in claim 5, characterized in that said control means further provides a third control signal for controlling at least one of the second and third converter units.

7. The power supply apparatus as claimed in claim 6, characterized in that the third control signal determines when the at least one of the second and third output voltages should be put into and/or out of operation.

* * * * *